Figure 1:
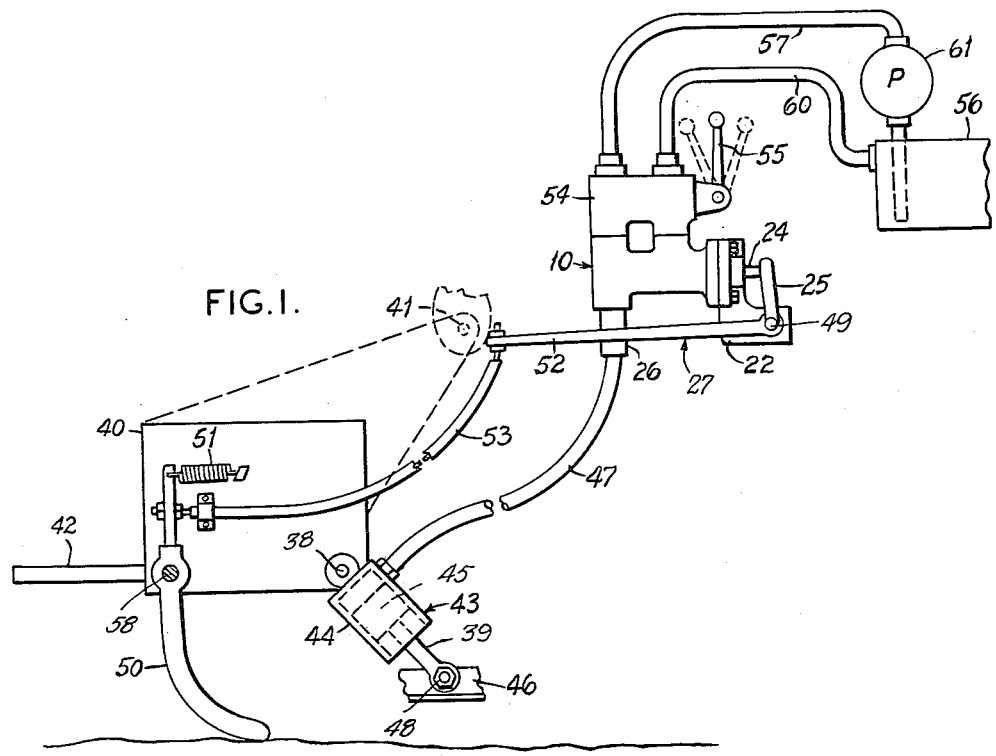

May 7, 1963     A. D. SALLEE     3,088,264

AUTOMATIC HEADER CONTROL MEANS

Filed April 14, 1961

INVENTOR.
AARON SALLEE

BY Cohn and Powell

ATTORNEYS

United States Patent Office 3,088,264
Patented May 7, 1963

3,088,264
AUTOMATIC HEADER CONTROL MEANS
Aaron D. Sallee, Seymour, Ind., assignor to Seymour Manufacturing Company, Seymour, Ind., a corporation of Indiana
Filed Apr. 14, 1961, Ser. No. 103,147
17 Claims. (Cl. 56—210)

This invention relates generally to an automatic header control means, and more particularly to an automatic control for regulating the effective cutting height of the cutting head grain table of a combine.

In the operation of a combine for the harvesting of many crops, it is very important for economical reasons to maintain the cutting head as close to the ground as possible in order to assure maximum yield. This is particularly true in the case of crops wherein the seed bearing portions are normally close to the ground, such for example as soybeans, lespedeza and the like, and also for harvesting grains and other seed crops which have been beaten down by storm so that their seed bearing heads are lying close to the ground. However, in all such cases it is at the same time also important to avoid running the cutters into the ground and thus causing the head to pick up dirt and stones along with the seed bearing material as well as possibly damaging the cutters.

Although many combines are now provided with a power-operated unit for adjusting the height of the cutting head, accurate control of this type of adjustment presents some practical difficulties. Since the adjustment is under control of the operator of the combine, who gauges by eye the proper height for the existing ground conditions as the harvesting proceeds, such operation has definite complications. For example, it is not easy for the operator to gauge the ground level accurately, in view of the fact that it is covered by the crop being cut, and this difficulty is most prevalent in the case of crops such as soybeans or beaten down grain which lie close to the ground and thus offer maximum concealment to variations in ground levels. At the same time, it is with such low-lying crops that an accurately low cutting height is most important, since upstanding grain crops can be effectively cut as much as a foot or more above the ground, thus making variations in the ground contour immaterial.

Because each time the cutters do run into the ground there is a possibility of causing damage to the harvest by including dirt, and because of the fact that there is a loss of time involved while the operator is cleaning out the machine, to say nothing of possible breakage of the cutter blades themselves, it is common practice to average these varied complicating factors by operating at a greater height than would otherwise be desirable in spite of the resulting loss in the harvest.

It is accordingly one of the principal objects of the present invention to provide an automatic control for a combine which will regulate the cutting height of the cutting head, which is adjustable to establish this cutting head at a desired minimum height for given crop and ground conditions, and which is effective to maintain this preset established height by automatic regulation to compensate for changes in ground contour without further attention on the part of the operator.

Another important objective is achieved by providing a metering valve adapted to control the lift and drop automatically of any hydraulically operated apparatus such as the cutter bar header of a self-propelled combine. The provision of a manual control for selectively determining the flow into the metering valve enables not only automatic operation for maintaining the header height, but also enables selectively either a condition in which the header is maintained stationary or a condition in which the header can be raised.

Still another important object is achieved by the incorporation of a safety lock-out in the metering valve which operates to maintain the header in a static fixed position when the hydraulic pressure is removed from the metering valve, it being necessary to restore hydraulic pressure to the system before the apparatus can either be lifted or lowered by means of the manual control.

Yet another important objective is realized by the provision of a plunger reciprocatively mounted in a chamber of the metering valve body, such plunger including a piston head sealably slidable in the chamber at one side of one of a pair of body ports and including a valve member extending toward a valve seat between the ports for regulating fluid flow between such ports. This structural arrangement of the plunger and the provision of a third port that interconnects the header ram with the chamber on the opposite side of the valve seat from the valve member assures that the piston head is only subjected to a low pressure volume of fluid. This feature is important when a moving O-ring is utilized to provide the sliding seal between the piston head and the body defining the chamber.

Another important object is afforded by the particular structure of the valve which enables any moving part to be replaced without detaching the valve body from its position in the system.

It is an important objective to provide a metering valve in which the valve body is provided with spaced first and seconds ports communicating with an internal chamber, a first valve means reciprocatively mounted in the chamber and movable toward or away from a valve seat between the first and second ports, a second valve member for opening and closing the first port and a third valve member adapted to open and close a third port communicating with the chamber on the same side of the valve seat as the first port, the second and third valve members interengaging to open the third port as the first port is opened and to close the first port as the third port is closed.

Another important objective is achieved by the placement of the metering valve in the apparatus that includes a means for selectively introducing fluid under pressure through either the first or second ports, the internal structure of the metering valve causing the second and third valve members to open respectively the first and third ports upon introducing fluid into the first port so that the ram raises the head as the first valve member is moved to a predetermined position and thereby maintaining the head at a constant height, and causing the third valve member to close the third port automatically upon stopping fluid flow into both of the first and second ports so that the trapped fluid in the ram holds the head stationary, and causing the second valve member to close the first port while the third valve member opens the third port upon introducing fluid through the second port so that the ram raises the head.

An important objective is to provide a metering valve with a safety lock-out feature and to provide an apparatus utilizing such a metering valve, the metering valve being simple and durable in construction, economical to manufacture and efficient in operation.

Figure 2:
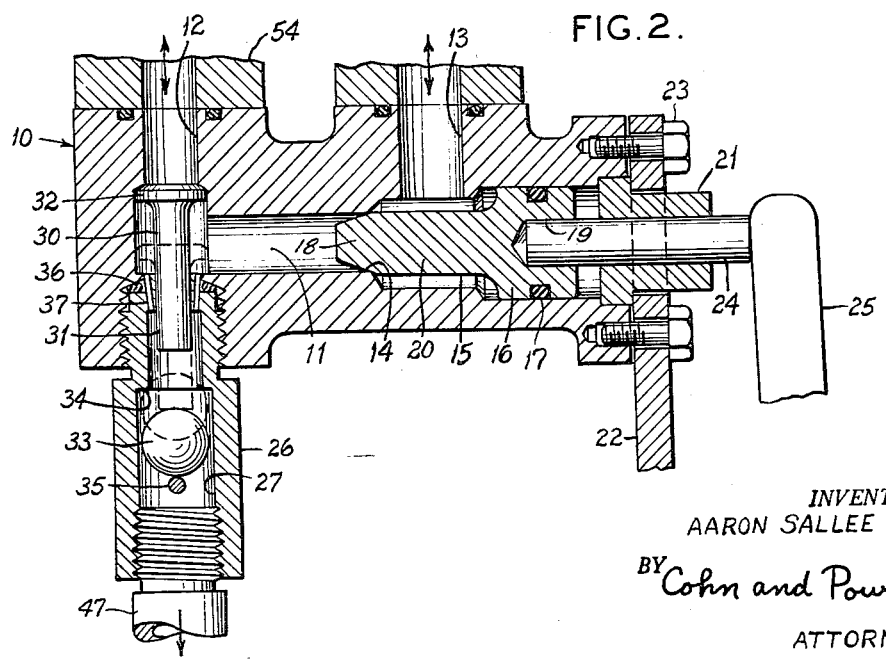

The foregoing and numerous other objects and advantages of this invention will more clearly appear from the following detailed description of a preferred embodiment of the metering valve and the system in which it is utilized, particularly when considered in connection with the accompanying drawings, in which:

FIG. 1 is a diagrammatic view of the apparatus for controlling the height of a cutting head in a combine, and FIG. 2 is an enlarged cross sectional view of the metering valve utilized in the apparatus of FIG. 1.

Referring now by characters of reference to the drawing, and first to FIG. 2, it is seen that the metering valve includes a valve body 10 including a chamber 11 formed therein, the chamber 11 being open at one end of body 10.

Formed in one side of valve body 10 is a first port 12 communicating with chamber 11. A cooperating second port 13 is formed in body 10 in spaced relation to the first port 12, the second port 13 communicating with chamber 11 toward its open end.

Located in chamber 11 at one side of second port 13 and located between the first and second ports 12 and 13 is a valve seat 14. A plunger 15 is reciprocatively mounted in valve chamber 11. The plunger 15 includes a piston head 16 that carries an O-ring 17 sealably slidable within the valve chamber 11 at the opposite side of second port 13. Furthermore, the plunger 15 includes a reduced valve member 20 formed integrally with the piston head 16, the valve member 20 extending across the second port 13 into operative relation with the valve seat 14. The valve member 20 includes a tapered forward end 18 that is adapted to move toward or away from the valve seat 14 upon reciprocation of the plunger 15 to regulate the amount of fluid flow between the first and second ports 12 and 13.

The open end of chamber 11 is closed by a plug 21 disposed adjacent the piston head 16. The plug 21 is held in place by a bracket plate 22 that embraces the plug 21, the bracket plate 22 being secured to the valve body 10 by screws 23. As will appear upon later description of the parts, the bracket plate 22 serves to mount the metering valve into the apparatus system.

A rod 24 is slidably mounted within the tubular plug 21 for reciprocating movement, one end of rod 24 being received in a socket 19 formed in piston head 16 while the opposite end extends outwardly beyond plug 21 to engage a lever arm 25 of a bell crank generally indicated at 27. Movement of lever arm 25 acts through rod 24 to cause reciprocating movement of plunger 15.

Threadedly attached to the valve body 10 directly opposite the first port 12 is a tubular casing 26 that constitutes a part of the valve body 10. The tubular casing 26 provides a third port 27 that communicates with the valve chamber 11, the third port 27 being directly aligned with the first valve port 12 and located on the same side of the valve seat 14 as the first port 12 and located between the port 12 and valve seat 14 when considering the flow from the first port 12 to the second port 13.

Reciprocatively mounted in the reduced end of tubular casing 26 is a poppet valve member 30. The poppet valve member 30 includes a stem 31 that extends into the tubular casing 26 and hence into the third port 27, and which extends into and across the valve chamber 11. The poppet valve member 30 also includes a head 32 adapted to open and close the first port 12. The head 32 opening the first port 12 under pressure of flow into the first port 12.

A ball valve member 33 is reciprocatively mounted within the tubular casing 26. Formed in the third port 27 is a valve seat 34 adapted to be engaged by the ball valve member 33. A stop pin 35 is secured to the casing 26 and is adapted to engage the ball valve member 33 to limit its movement away from the valve seat 34.

When the poppet valve member 30 is moved inwardly of the tubular casing 26 upon opening of the first port 12, the stem 31 engages the ball valve member 33 and moves the ball valve member 33 away from the valve seat 34. The third port 27 receives flow after passage into and through the first port 12. The ball valve member 33 upon engagement with the stop pin 35 maintains the poppet valve member 30 in position so that the head 32 of such poppet valve member 30 is located substantially midway in the valve chamber 11.

The inner reduced end of tubular casing 26 engages an O-ring 36 to provide an effective seal between the casing 26 and valve body 10. A plurality of passages 37 are formed in the front end of tubular casing 26 immediately adjacent the periphery of the stem 31 of poppet valve member 30 to provide direct communication of the third port 27 with the chamber 11.

The apparatus in which the metering valve is utilized, is shown in FIG. 1. This apparatus includes a cutting head 40 of a combine adapted for movement in an up or down direction. In FIG. 1, the head 40 is shown pivotally mounted to the frame of the combine about pivot point 41. The head 40 includes cutting blades generally indicated at 42 and diagrammatically illustrated in FIG. 1. The adjustment of the head 40 in an up or down direction regulates the height of the cutting blade 41. This general type of combine is shown in U.S. Patents Nos. 2,589,553, 2,750,727 and 2,842,925.

A one way ram 43 is operatively connected to the head 40 and is adapted to raise such head 40 under the action of applied hydraulic force. The ram 43 includes a cylinder 44 pivotally connected at one end by a pin 38 to the head 40 and includes a piston 45 having its rod 39 pivotally connected by a pin 48 to a frame member 46 of the combine. A fluid line 47 interconnects the ram 43 with the tubular casing 26 and therefore with the third port 27. Fluid pressure can be exerted in the ram 43 through fluid line 47 of ram 43, and hence cause elevation of the cutting head 40. Because the cutting head 40 moves in an arc, the ram 43 will pivotally adjust its position on pins 38 and 48 to accommodate any adjusted height position of head 40.

Pivotally mounted by pins 58 on the cutting head 40 are a plurality of feelers 50, one of which is shown in FIG. 1, adapted to engage the ground and determine any variation of ground contour below the head 40 for the entire width of such head. A spring 51 is operatively connected to the feelers 50 and tends to urge the feelers 50 downwardly into contact with the subjacent ground.

The mounting bracket 22 is secured to the combine frame and serves to mount the body 10 of the metering valve previously described. A linkage operatively interconnects the feelers 50 with the reciprocating plunger 15 to control the position of plunger 15 and thereby regulate the flow between the valve ports 12 and 13. It will be noted from FIG. 1 that the bell crank 27 having the lever arm 25 is pivoted by pin 49 to the mounting bracket 22. The other lever arm 52 of the same bell crank 27 is connected by a flexible control cable 53 to the feelers 50.

For example, upon lowering the head 40, the feelers 50 will engage the ground and be rotated in a counterclockwise direction (FIG. 1) against the loading of spring 51, thereby pulling cable 53 to cause a corresponding counterclockwise rotation of bell crank 27. The lever arm 25 will act through rod 24 to push the plunger 15 toward the valve seat 14. Conversely, upon raising the head 40, the feelers 50 will be rotated clockwise under loading of spring 51, thereby pushing the cable 53 to cause a corresponding clockwise rotation of bell crank 27. As the lever arm 52 moves, the plunger 14 moves away from the seat 14 under fluid pressure, the rod 24 engaging the arm 52.

Movement of the feelers 50 is transmitted by control cable 53 to the lever arm 52, whereby to pivot the arm 52 in a direction depending upon the direction of pivotal movement of feelers 50. Of course, upon movement of lever arm 52, a corresponding pivotal movement will be transmitted to the lever arm 25. As discussed previously, movement of lever arm 25 will be transmitted by rod 24 to the plunger 15. Thus it is seen that the position of plunger 15 is determined by the position of feelers 50, and consequently the amount of flow between the first and second ports 12 and 13 is determined by the position of feelers 50.

Mounted to the valve body 10 is a conventional 4-way valve 54 adapted to introduce fluid under pressure to either the first port 12 or the second port 13. This 4-way control valve 54 includes a control lever 55 that is movable to three distinct positions hereinafter to an automatic position, a neutral position and a manual lift position. This general type of 4-way valve is shown in U.S. Patent No. 2,362,339.

The hydraulic system utilized in this apparatus includes a reservoir 56 connected to the 4-way control valve 54 by a pair of hydraulic lines 57 and 60. A pump 61 is connected in one of the hydraulic lines 57 to supply fluid under pressure to the 4-way control valve 54.

It is thought that the operation and functional advantages of apparatus and the metering valve with its safety lock-out feature have become fully apparant from the foregoing detailed description of parts, but for completeness of disclosure, the operation of the apparatus and metering valve will be briefly described with the control lever 55 located in each of its three operating positions.

First it will be assumed that the hydraulic pressure is turned off and that the control lever 55 is in its automatic position. When the control lever 55 is so positioned, the 4-way control valve 54 is conditioned to feed fluid under pressure to the first port 12 and is adapted to receive the fluid from the metering valve body 10 through the second valve port 13. However because the hydraulic pressure is turned off, the fluid pressure existing in the ram 43 and in fluid line 47 causes the ball valve member 33 to contact its valve seat 34 and close the third port 27, thereby maintaining the cutting head 40 in a stationary position.

When the hydraulic pressure is turned on, fluid under pressure is introduced through the first port 12 causing the poppet valve member 30 to unseat. As the poppet valve member 30 opens the first port 12, the stem 31 of the poppet valve member 30 engages the ball valve member 33 and opens the third port 27. The bulk of the fluid under pressure passing into the body channel 11 flows from the first port 12 past the valve member 20 and out of the second port 13 back into the 4-way control valve 54. Because the ball valve member 33 is open, the fluid can flow through the third port 27.

The cutting head 40 drops under gravity to a predetermined height above the ground. As the cutting head 40 approaches this predetermined height position, the feelers 50 engaging the ground operate through the control cable 53, lever arms 52 and 25, and rod 24 to push in on the plunger 15. This movement of the plunger 15 in a direction to move the valve member 20 toward its valve seat 14 reduces the flow of fluid out of the second port 13, and consequently channels more of the fluid flow through the third port 27 into the hydraulic ram 43, thereby causing the ram 43 to lift the head.

As the cutting head 40 is raised, the feelers 50 engaging the ground will rotate and act through the same linkage when a predetermined height position of the head is reached, to allow the plunger 15 to move in a direction so that its valve member 20 moves away from its valve seat 14. This action of plunger 15 causes more of the fluid to pass from the first port 12 to the second port 13, and thereby causes a pressure drop in the body chamber 11. Fluid in the ram 43 and the fluid line 47 then flows through the third port 27 into the body chamber 11, thereby causing the head 40 to lower.

It is apparent from the foregoing description that the feelers 50 operate through interconnecting linkage to position the plunger 15 so as to regulate the fluid flow in order to maintain the cutting head 40 at a predetermined height. The sensitivity of the metering valve can be changed by changing the angle of point of the valve member 20 of plunger 15.

It will be noted that the single O-ring 17 carried by the piston head 16 of plunger 15 is subjected to a low pressure volume of fluid.

When the control lever 55 is located in its neutral position or when the hydraulic pump 61 is shut off, fluid flow to the metering valve is terminated. The cutting head 40 will tend to lower causing a contraction of the ram 43, thereby increasing the fluid pressure in the ram 43 and in the fluid line 47. The fluid in line 47 will try to rush past the ball valve member 33 into the metering valve. This fluid flow through the third port 27 will cause the ball valve member 33 to seat immediately and the pressure in the ram 43 will keep the ball valve 33 seated. As mentioned previously, when the ball valve member 33 is seated in this manner, the cutting head 40 is held in a stationary height position. Once the ball valve member 33 is seated it will remain seated until the poppet valve member 30 again engages the ball valve member 33 and unseats it upon applying fluid pressure in the first port 12. It is seen that the ball valve member 33 provides a safety lock-out feature in that the ram 43 cannot be moved in either direction until fluid pressure is resumed.

When the control lever 55 is placed into the manual lift position, the 4-way control valve 54 is conditioned to introduce fluid under pressure through the second port 13. The piston head 16 of plunger 15 is of sufficient size so that when under fluid pressure exerted through second port 13, the plunger 15 is pushed back so that the valve member 20 moves away from its valve seat 14, thereby allowing fluid under pressure to flow past the valve seat 14 into the valve chamber 11 between the valve ports 12 and 13. When this fluid under pressure in chamber 11 is exerted on the poppet valve member 30, the poppet valve member moves to close the first passage 12. All of the fluid then channels into the third port 27, opening the ball valve member 33 and flowing through fluid line 47 into ram 43. This exertion of fluid pressure in ram 43 causes an expansion of the ram and causes the cutting head 40 to raise. The head 40 is lifted by the ram 43 until the ram 43 is fully extended or until the control lever 55 is placed in its neutral position or in its automatic position.

When the control lever 55 is put into neutral position, the ram 43 will hold the cutting head 40 in a stationary position because of the lock-out feature described previously. However when the control lever 55 is put into its automatic position, the metering valve will operate under automatic conditions. For example, the cutting head 40 will lower and cause a retraction of ram 43 until the feelers 50 engaging the ground below the head determine a predetermined height position at which the plunger 15 is pushed in a direction toward the valve seat 14 to a predetermined position in the valve chamber 11 for regulating the flow between the first port 12 and the second port 13, whereby fluid flow through the third port 27 actuates the ram 43 automatically to maintain the cutting head at the desired height. Thereafter, the ram 43 will raise and lower automatically as long as there is hydraulic pressure in the system and until the control lever 55 is returned to either its neutral or manual lift position.

Although the invention has been described by making detailed reference to a single preferred embodiment, such detail is to be understood in an instructive, rather than in any restrictive sense, many variants being possible within the scope of the claims hereunto appended.

I claim as my invention:

1. A metering valve with safety lock-out comprising a valve body provided with a chamber therein, the valve body being provided with first and second ports communicating with said chamber, a first valve means in said chamber between said first and second ports for regulating flow therebetween, the body being provided with a third port on the same side of the first valve means as said first port and located therebetween, and a second valve means for opening and closing said first and third ports, said second valve means opening said first port under pressure of flow into said first port, the third port receiving flow after passage into and through said first port, the second valve means opening the third port as the first is opened and closing the first port as the third port is closed.

2. A metering valve with safety lock-out comprising a valve body provided with a chamber therein, the valve body being provided with first and second ports communicating with said chamber, a valve seat in said chamber between said first and second ports, a metering plunger reciprocatively mounted in said chamber and including a first valve member movable toward or away from said valve seat to regulate flow between said first and second ports, a second valve member mounted in said body for opening or closing said first port, said second valve member opening said first port under pressure of flow into said first port, the body being provided with a third port communicating with said chamber on the same side of the valve seat as the first port and located therebetween, and a third valve member for opening or closing said third port, the third port receiving flow after passage into and through said first port, said second and third valve members interengaging to open said third port as first port is opened and to close the first port as the third port is closed.

3. A metering valve with safety lock-out comprising a valve body provided with a chamber therein, the valve body being provided with first and second ports communicating with said chamber, a first valve means mounted in said chamber for regulating flow between said first and second ports, the body being provided with a third port commuicating with said chamber on the same side of the first valve means as the first port and located therebetween, a reciprocatively mounted second valve member for opening or closing said first port, said second valve member opening said first port under pressure of flow into said first port, and a reciprocatively mounted third valve member for opening or closing said third port, said third port receiving flow after passage into and through said first port, said second and third valve members interengaging to open said third port as the first port is opened and to close the first port as the third port is closed.

4. A metering valve with safety lock-out comprising a valve body provided with a chamber therein, and provided with spaced first and second ports communicating with said chamber, a first valve means mounted in said chamber for regulating flow between said first and second ports, a tubular casing detachably secured to said body and provided with a third port communicating with said chamber and located between said first valve means and first port, a second valve member reciprocatively mounted in said casing and extending across said chamber to open or close said first port, said second valve member opening said first port under pressure of flow into said first port, and a third valve member reciprocatively mounted in said casing for opening or closing said third port, said third port receiving flow after passage into and through said first port, the second and third valve members interengaging to open said third port as the first port is opened and to close the first port as the third port is closed.

5. A metering valve with safety lock-out comprising a valve body provided with a chamber therein, and provided with spaced first and second ports communicating with said chamber, means mounted in said chamber for regulating flow between said first and second ports, a tubular casing detachably secured to said body and provided with a third port communicating with said chamber and located between said means and said first port, a first valve seat about said first port, a second valve seat in said tubular casing providing a third port, a first valve member reciprocatively mounted in said casing and extending across said chamber, the first valve member having a head adapted selectively to engage the first valve seat for opening or closing the first valve port, said head opening said first port under pressure of flow into said first port, and a second valve member reciprocatively mounted in said casing for opening or closing said third port, said third port receiving flow after passage into and through said first port, the first valve member having a stem extending into said tubular casing and adapted to engage the second valve member to open said third port as the first port is opened and to close the first port as the third port is closed.

6. A metering valve with safety lock-out comprising a valve body provided with a chamber therein, the valve body being provided with spaced first and second ports communicating with said chamber, a valve seat in said chamber between said first and second ports, a metering plunger reciprocatively mounted in said chamber and including a first valve means movable toward or away from said valve seat to regulate flow between said first and second ports, the body being provided with a third port communicating with said chamber on the same side of the valve seat as the first port and located between said valve seat and first port, and a second valve means for opening and closing said first and third ports, said second valve means opening the third port as the first port is opened and closing the first port as the third port is closed, the second valve means opening said first port under pressure of flow into said first port, said third port receiving flow after passage into and through said first port.

7. A metering valve with safety lock-out comprising a valve body provided with a chamber therein, the valve body being provided with spaced first and second ports communicating with said chamber, a valve seat in said chamber at one side of the second port between the said first and second ports, a metering plunger reciprocatively mounted in said chamber, said plunger including a piston head sealably slidable in said chamber at the opposite side of said second port, and including a reduced first valve member extending past the second port and movable toward or away from the said valve seat to regulate flow between the first and second ports, the body being provided with a third port communicating with said chamber on the same side of the valve seat as said first port and located between said valve seat and first port, a reciprocatively mounted second valve member for opening or closing said first port, said second valve member opening said first port under pressure of flow into said first port, and a reciprocatively mounted third valve member for opening or closing said third port, said third port receiving flow after passage into and through said first port, said second and third valve members interengaging to open said third port as the first port is opened and to close the first port as the third port is closed.

8. A metering valve with safety lock-out comprising a valve body provided with a chamber therein, the valve body being provided with spaced first and second ports communicating with said chamber, a valve seat in said chamber at one side of the second port and between the first and second ports, a metering plunger reciprocatively mounted in said chamber, the plunger having a piston head sealably slidable in said chamber at the opposite side of said second port, and having a reduced first valve member extending past the second port and movable toward or away from the valve seat to regulate flow between the first and second parts, a plug closing the open end of said chamber, a rod connected to the piston head and extending through said plug, the rod being adapted to reciprocate said plunger, the body being provided with a third port communicating with said chamber on the same side of the valve seat as the first port and located between said valve seat and first port, and valve means for opening and closing said first and third ports, said valve means opening the third port as the first port is opened and closing the first port as the third port is closed, said valve means opening said first port under pressure of flow into said first port, said third port receiving flow after passage into and through said first port.

9. A metering valve with safety lock-out comprising a valve body provided with a chamber therein opening at one end of said body, the body being provided with spaced first and second ports communicating with said chamber, a valve seat at one side of the second port and between the first and second ports, a metering plunger reciprocatively mounted in said chamber, said plunger including a piston head sealably slidable in said chamber at the opposite side of said second port, and having a reduced first valve member extending past the second port and movable toward or away from the valve seat to regulate flow between the first and second ports, a plug closing the open end of said chamber, a rod connected to the piston head and extending through said plug, the body being provided with a third port communicating with said chamber on the same side of the valve seat as the first port and located between the valve seat and first port, a second valve member reciprocatively mounted in said body including a head selectively opening or closing the first port and a stem extending across said chamber into said third port, said head opening said first port under pressure of flow into said first port, a third valve member reciprocatively mounted in said body for opening or closing the third port, the stem of said second valve member engaging said third valve member to move the said third valve member in a direction to open said third port as the second valve member is moved in a direction to open the first port, said third port receiving flow after passage into and through said first port, and means limiting movement of said third valve member in its open position so as to hold the head of said second valve member substantially midway in said chamber when said second valve member is in its open position, the third valve member engaging the stem of said second valve member to move the second valve member in a direction to close the first port as the third valve member is moved in a direction to close the third port.

10. In an apparatus for maintaining a substantially constant cutting height for the cutting head of a combine, an adjustably mounted head, a one-way fluid ram connected to said head, feelers carried by the head to detect any variation in ground contour below the head, a metering valve comprising a body having a chamber therein, the body being provided with spaced first and second ports communicating with said chamber, a first valve means in said chamber for regulating flow between said first and second ports, means interconnecting the first valve means with said feelers for actuating the first valve means in response to the position of said feelers, the body being provided with a third port communicating with said chamber between said first port and said first valve means, a second valve means for opening or closing said first and third ports, means connecting the third port with said ram, and means for selectively introducing fluid under pressure through said first port, said second valve means opening said first and third ports upon introducing fluid into and through said first port, the third port receiving flow after passage into and through said first port so that said ram raises said head as the first valve means is moved to a predetermined position, and thereby maintaining the head at a constant height.

11. In an apparatus for maintaining a substantially constant cutting height for the cutting head of a combine, an adjustably mounted head, a one-way fluid ram connected to said head, feelers carried by the head to detect any variation in ground contour below the head, a metering valve comprising a body having a chamber therein, the body being provided with spaced first and second ports communicating with said chamber, a valve seat between said first and second ports, a first valve member reciprocatively mounted within said chamber and movable toward or away from said seat for regulating flow between said first and second ports, means connecting the first valve member with said feelers for reciprocating the first valve means in response to the position of said feelers, the body being provided with a third port communicating with said chamber on the same side of the valve seat as said first port and located therebetween, a second valve member for opening or closing said first port, a third valve member for opening or closing said third port, means connecting the third port with said ram, and means for selectively introducing fluid under pressure through said first port, said second and third valve members being interconnected to open said first and third ports upon introducing fluid into and through said first port, the third port receiving flow after passage into and through said first port so that said ram raises said head as the first valve member is moved to a predetermined position and thereby maintains the head at a constant height.

12. In an apparatus for maintaining a substantially constant cutting height for the cutting head of a combine, an adjustably mounted head, a one-way fluid ram connected to said head, feelers carried by the head to detect any variation in ground contour below the head, a metering valve comprising a body having a chamber therein, the body being provided with spaced first and second ports communicating with said chamber, a valve seat between said first and second ports, a first valve member reciprocatively mounted in said chamber and movable toward or away from said seat for regulating flow between said first and second ports, means connecting the first valve member to said feelers for reciprocating the first valve member in response to the position of said feelers, the body being provided with a third port communicating with said chamber on the same side of the valve seat as said first port and located therebetween, a second valve means in said body for opening or closing said first and third ports, means interconnecting the third port with said ram, and means for selectively introducing fluid under pressure through either of said first or second ports, said second valve means opening said first and third ports upon introducing fluid into and through said first port, the third port receiving the flow ofter passage into and through the first port so that said ram raises said head as the first valve means is moved to a predetermined position and thereby maintains the head at a constant height, and said second valve means closing said first port yet holding the third port open upon introducing fluid into and through said second port so that said ram raises the head.

13. In an apparatus for maintaining a substantially constant cutting height for the cutting head of a combine, a head mounted for movement in an up or down direction, a one-way ram connected to the head for operatively raising said head, feelers carried by the head to detect variation in ground contour below said head, a metering valve comprising a body having a chamber therein, the body being provided with spaced first and second ports communicating with said chamber, means for selectively introducing fluid under pressure to either of said first or second ports, a first valve means in said chamber between said first and second ports for regulating flow therebetween, means connecting the first valve means to said feelers for increasing or decreasing flow from said first port to said second port in response to the position of said feelers, the body being provided with a third port on the same side of the first valve means as said first port and located therebetween, a second valve means in said body for opening or closing said first port, said second valve means opening said first port under pressure of flow introduced into said first port, a third valve means in said body for opening or closing said third port, and means connecting the third port to said ram, said second and third valve means being operatively interconnected to open respectively said first and third ports upon introducing fluid to said first port, said third port receiving flow after passage into and through the first port so that said ram raises the head as the first valve means is moved to a predetermined position and thereby maintains the head at a constant height, said third valve means closing said third port automatically upon stopping fluid flow into both first and second ports so that the trapped fluid in said ram holds the head stationary, and said second valve means closing said first port while the third valve means opens the third port upon introducing fluid into and through said second port so that the first valve means is opened, whereby said ram raises the head.

14. In an apparatus for maintaining a substantially constant cutting height for the cutting head of a combine, a head mounted for movement in an up or down direction, a one-way ram connected to the head for operatively raising said head, feelers carried by the head to detect variations in ground contour below said head, a metering valve comprising a body having a chamber therein, the body being provided with spaced first and second ports communicating with said chamber, means selectively introducing fluid under pressure to either of said first or second ports, a valve seat in said chamber at one side of said second port and between the first and second ports, a plunger reciprocatively mounted in said chamber including a piston head sealably slidable in said chamber at the opposite side of said second port, and a first valve member extending across said second port for movement toward or away from said seat to regulate flow between said first and second ports, means connecting the plunger to said feelers for increasing or decreasing flow from said first port to said second port in response to the position of said feelers, the body being provided with a third port on the same side of said valve seat as said first port and located therebetween, a second valve member in said body for opening or closing said first port, said second valve member opening said first port under pressure of flow introduced into said first port, a third valve member in said body for opening or closing said third port, and means connecting the third port to said ram, said second and third valve members being operatively interconnected to open respectively said first and third ports upon introducing fluid into said first port, said third port receiving flow after passage into and through said first port so that said ram raises the head as the plunger moves to a predetermined position and thereby maintains the head at a constant height, said third valve means closing said third port automatically upon stopping fluid flow into both of said first and second ports so that the trapped fluid in said ram holds the head stationary, and said second valve member closing said first port while the third valve member opens the third port upon introducing fluid into and through said second port so that the said piston head moves said first valve member away from said valve seat, whereby said ram raises the head.

15. In an apparatus for maintaining a substantially constant cutting height for the cutting head of a combine, a head mounted for movement in an up or down direction, a one-way ram connected to the head for operatively raising said head, feelers carried by the head to detect variations in ground contour below said head, a metering valve comprising a body having a chamber therein, the body being provided with spaced first and second ports communicating with said chamber, means selectively introducing fluid under pressure to either of said first or second ports, a first valve member in said chamber between said first and second ports for regulating flow therebetween, means connecting the first valve member to said feelers for increasing or decreasing flow from said first port to said second port in response to the position of said feelers, the body being provided with a third port on the same side of the first valve member as said first port and located therebetween, a second valve member in said body including a head in said chamber for opening or closing said first port and a stem extending into said third port, said head opening said first port under pressure of flow introduced into said first port, a third valve member in said body for opening or closing said third port, and means connecting the third port to said ram, the stem of said second valve member engaging said third valve member as the first port is opened upon introducing fluid into said first port so that said third valve member opens the third port to receive flow after passage through said first port to enable the ram to raise the head when the first valve member is moved to a predetermined position and thereby maintain the head at a constant height, said third valve member closing said third port automatically upon stopping fluid flow into both of said first and second ports so that the trapped fluid in said ram holds the head stationary, and the head of said second valve member closing the first port as the third valve member opens the third port upon introducing fluid into and through said second port so that said ram raises the head.

16. In an apparatus for maintaining a substantially constant cutting height for the cutting head of a combine, a head mounted for movement in an up or down direction, a one-way ram connected to the head for operatively raising said head, feelers carried by the head to detect variations in ground contour below said head, a metering valve comprising a body having a chamber therein, the body being provided with spaced first and second ports communicating with said chamber, a seat in said chamber at one side of said second port and between said first and second ports, a plunger reciprocatively mounted in said chamber, said plunger including a piston head sealably slidable in said chamber at the opposite side of said second port and including a reduced first valve member extending from said piston across said second port, said first valve member being movable toward or away from said seat for regulating flow between said first and second ports, means connecting the plunger to said feelers for increasing or decreasing flow from said first port to said second port in response to the position of said feelers, the body being provided with a third port on the same side of the seat as said first port and located between said first port and said seat, a second valve member reciprocatively mounted in said body including a head in said chamber for opening or closing said first port and a stem extending into said third port, said head opening said first port under flow pressure introduced into said first port, a third valve member reciprocatively mounted in said body for opening or closing said third port, means connecting the third port to said ram, the stem of said second valve member engaging the third valve member to open the third port as the head of said second valve member opens said first port under flow pressure upon introducing fluid into said first port, the third port receiving flow after passage into and through the first port by the head of said second valve member so that said ram raises the head when the plunger is moved to a predetermined position and thereby maintains the head at a constant height, and means limiting movement of the third valve member in its open position and thereby holding the head of said second valve member substantially midway in said chamber, said third valve member closing said third port automatically upon stopping fluid flow into both of said first and second ports so that the trapped fluid in said ram holds the head stationary, the head of said second valve member closing the first port and the third valve member opening the third port upon introducing fluid into and through said second port so that said ram raises the head.

17. In an apparatus for maintaining a substantially constant cutting height for the cutting head of a combine, a head mounted for movement in an up or down direction, a one-way ram connected to the head for operatively raising said head, feelers carried by the head to detect variation in ground contour below said head, a metering valve comprising a body having a chamber therein opening at one end of the body, the body being provided with spaced first and second ports communicating with said chamber, a valve seat in said chamber at one side of said second port and between said first and second ports, a plunger reciprocatively mounted in said chamber, the plunger including a piston head sealably slidable in said chamber at the opposite side of said second port and including a reduced first valve member extending from said piston past the second port, the first valve member being movable toward or away from the valve seat to regulate fluid flow between the first and second ports, a plug closing the open end of said chamber, a rod connected to the piston head and extending through said plug, means connecting the rod to said feelers for reciprocating the plunger in response to the position of said feelers and thereby increasing or decreasing fluid flow from the first port to the second port, a tubular casing detachably connected to said body including a third port communicating with said chamber at the same side of the valve seat as said first port, a second valve member reciprocatively mounted in said tubular casing, the second valve member including a head located in said chamber for opening or closing said first port and including a stem extending into said third port, said head opening said first port under pressure of flow introduced into said first port, a third valve member reciprocatively mounted in said tubular casing for opening or closing said third port, a fluid line connecting the third port to said ram, the stem of said second valve member engaging the third valve member so that said third valve member opens the third port as the head of said second valve member opens the first port under flow pressure introducing fluid into said first port, said third port receiving flow after passage through the first port by the head of said second valve member, thereby enabling the ram to raise the head as the first valve member is moved to a predetermined position and thereby maintain the head at a constant height, and means limiting the open position of said third valve member to hold the head of the second valve member substantially midway in said chamber, said third valve member closing said third port automatically upon stopping fluid flow into both of said first and second ports so that the trapped fluid in said ram holds the head stationary, and said second valve member closing said first port while the third valve member opens the third port upon introducing fluid into and through said second port so that said ram raises the head.

References Cited in the file of this patent

UNITED STATES PATENTS

| | | |
|---|---|---|
| 2,164,911 | Garverick | July 4, 1939 |
| 2,362,339 | Armington | Nov. 7, 1944 |
| 2,526,406 | Pfauser et al. | Oct. 17, 1950 |
| 2,589,553 | Kesselring | Mar. 18, 1952 |
| 2,660,015 | Briscoe | Nov. 24, 1953 |
| 2,726,680 | Baines | Dec. 13, 1955 |
| 2,842,925 | Allen | July 15, 1958 |